United States Patent
Baumgartner et al.

(10) Patent No.: US 6,736,244 B2
(45) Date of Patent: May 18, 2004

(54) PNEUMATIC DISK BRAKE WITH PRESSURE ELEMENTS

(75) Inventors: Hans Baumgartner, Moosburg (DE); Dieter Bieker, Oberaudorf (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/286,971

(22) Filed: Nov. 4, 2002

(65) Prior Publication Data

US 2003/0094335 A1 May 22, 2003

Related U.S. Application Data

(63) Continuation of application No. PCT/EP01/03814, filed on Apr. 4, 2001.

(30) Foreign Application Priority Data

May 3, 2000 (DE) .......................................... 100 21 571

(51) Int. Cl.[7] .............................................. F16D 55/16
(52) U.S. Cl. ................. 188/72.7; 188/72.9; 188/106 F; 188/355; 384/191.2
(58) Field of Search ............................. 188/72.7, 72.9, 188/72.1, 72.6, 71.7, 71.8, 73.34, 106 F, 355, 356; 384/191.2, 206, 213; 403/135, 140

(56) References Cited

U.S. PATENT DOCUMENTS

| | | |
|---|---|---|
| 4,109,765 A | 8/1978 | Johannesen ................ 188/72.7 |
| 5,515,949 A | 5/1996 | Baumgartner et al. |
| 5,547,048 A | 8/1996 | Anthony |
| 5,558,185 A | 9/1996 | Tribuzio et al. |
| 5,582,273 A * | 12/1996 | Baumgartner et al. ..... 188/72.6 |
| 5,680,912 A * | 10/1997 | Herbert et al. ............. 188/72.9 |
| 5,697,474 A * | 12/1997 | Antony et al. ............. 188/72.6 |
| 5,833,035 A | 11/1998 | Severinsson |

FOREIGN PATENT DOCUMENTS

| | | |
|---|---|---|
| DE | 2922472 | 12/1979 |
| DE | 35 05 773 | 8/1986 |
| DE | 44 30 258 | 1/1996 |
| EP | 0949433 | 10/1999 |
| WO | 98/26968 | 6/1998 |

OTHER PUBLICATIONS

Search Report.

* cited by examiner

Primary Examiner—Pam Rodriguez
(74) Attorney, Agent, or Firm—Crowell & Moring LLP

(57) ABSTRACT

A disk brake, preferably a compressed air operated disk brake, comprising a caliper which encompasses the brake disk, and an actuating device which is arranged on one side of the brake disk and provided with a pivotally mounted rotary lever. The rotary lever acts upon a cross member which can be displaced in relation to the disk brake on an eccentric device provided with a pressure element. The invention is characterized in that the at least one pressure element of the eccentric device forms a spherical element.

20 Claims, 4 Drawing Sheets

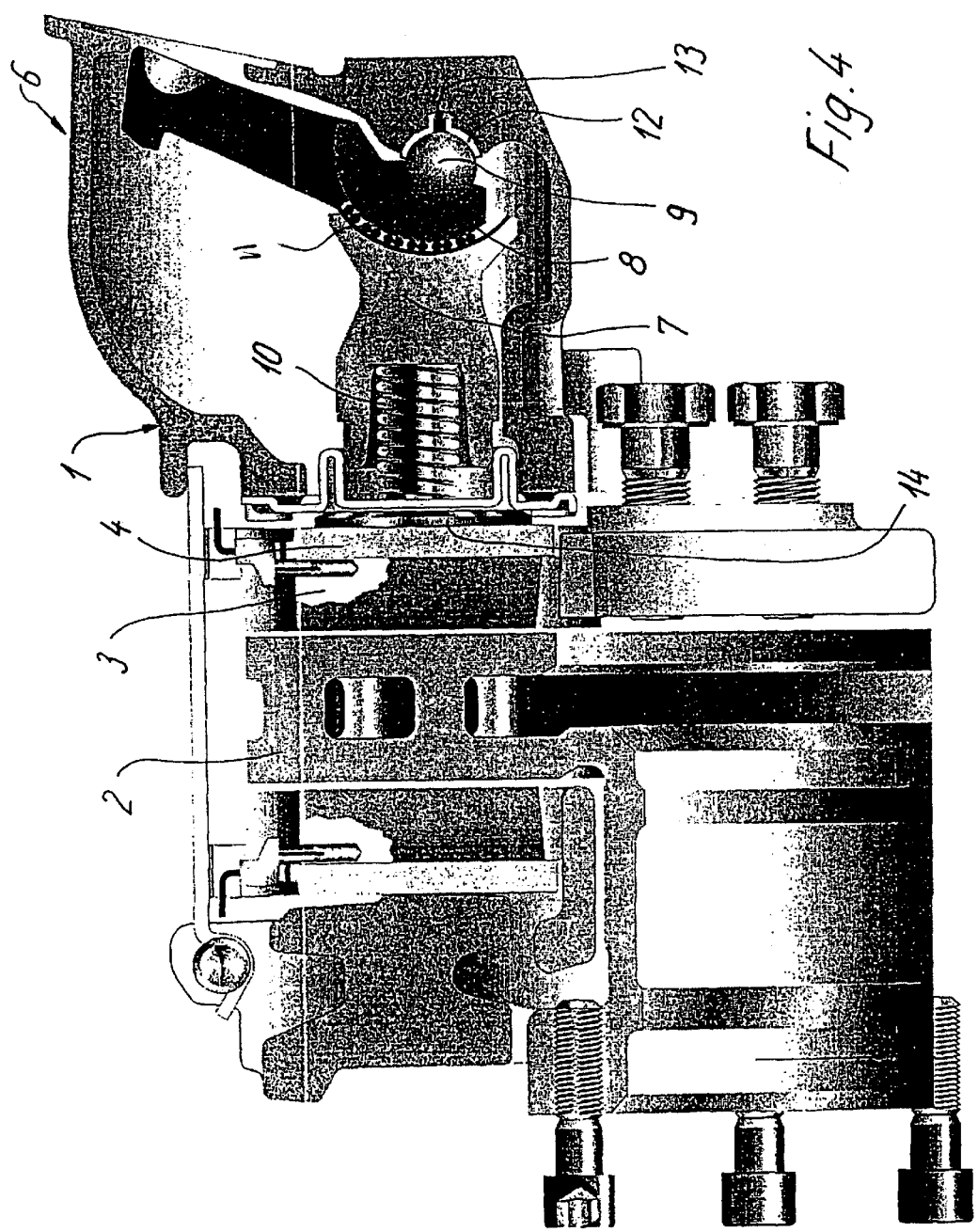

PNEUMATIC DISK BRAKE WITH PRESSURE ELEMENTS

CROSS REFERENCE TO RELATED APPLICATIONS

This application is a continuation of PCT international application no. PCT/EP01/03814, filed Apr. 4, 2001, and claims priority based on German patent application no. DE 100 21 571.8 filed May 3, 2000, the specifications of which are incorporated by reference herein.

BACKGROUND AND SUMMARY OF THE INVENTION

The invention relates to a disk brake, preferably a compressed air (pneumatic) operated disk brake, comprising a caliper which encompasses the brake disk, and an actuating device which features a rotary lever supported on pivot bearings. The actuating device is arranged on one side of the brake disk. The rotary lever rests against an eccentric device featuring a pressure element and acts directly or indirectly upon a cross member, which can be displaced in relation to the brake disk.

In generic disk brakes, the transmission of forces occurs when the brake cylinder is operated through a rod, which acts upon the rotary lever. The rotary lever is supported in the caliper housing by means of a pivot bearing. A cylindrical pivot-bearing shaft of an eccentric device is arranged in a recess in the rotary lever offset against the axis of rotation. Pivoting of the rotary lever causes a spring-loaded cross member to be displaced transversely relative to the surface of the brake disk. On the side facing away from the brake disk, this cross member engages at least one rotary spindle with a pressure plate, which presses against the brake shoe when the brake is operated, so that the brake lining contacts the brake disk. The generic disk brake can be executed as a single-spindle device or as a double-spindle device.

In known disk brakes, the moveable components, particularly the support of the eccentric device and the rotary lever against the housing, are to some extent executed as maintenance-free plain bearing half liners or as roller bearings. The rotary lever is supported in semi-cylindrical plain bearing half liners in the area of the housing facing away from the brake disk. The eccentric bearing is supported eccentrically to the bearing of the rotary lever in a semi-cylindrical recess in the rotary lever. A roller bearing in the form of a semi-cylindrical liner is inserted into this recess. Force is transmitted through the cylindrical shaft.

When the disk brake is operated, transverse forces develop due to the diagonal running of the bearings, which is caused by tolerances and by deformations linked to operating conditions, as well as by the vibration stress occurring during vehicle operation and the resulting forces of gravity. Consequently, corresponding locking elements for the rotary lever and for the cylindrical pressure elements arranged in the ball cups are needed to transmit the transverse forces. In addition, mechanically tooled guide surfaces are also necessary. The guide surfaces and locking elements not only increase production costs, but also increase the complexity of assembly of the disk brake. In addition, susceptibility to failure is increased.

Consequently, the underlying problem behind the invention is to design a compressed air operated disk brake using a simple design, so that the transverse forces occurring upon operation of the brake can be transmitted without locking elements and without guide surfaces. In addition, the disk brake should continue to exhibit high stability under load and should be designed in compact form.

This problem is solved by providing a disk brake wherein at least one pressure element of the eccentric device is designed to be essentially spherical or oval-, and/or barrel- or bale-shaped, thus comprising a spherical pressure element.

The transverse forces occurring during the braking process are now no longer removed by means of additional locking elements and the guide surfaces that are necessary as a result, but rather through the spherical pressure elements themselves. Consequently, the design can be manufactured in an especially cost-efficient manner, due to the reduction in the number of components, and, furthermore, is easily assembled. As the number of components is reduced in comparison to known designs, susceptibility to failure is reduced.

An especially advantageous embodiment of the invention is characterized by the fact that the spherical pressure elements are supported in essentially dome-shaped plain bearing half liners, which, in a structurally simple manner, interact with the spherical pressure elements to absorb the transverse forces that occur. The spherical pressure elements or their plain bearing half liners can be inserted into essentially dome-shaped recesses in the bridge or cross member and the rotary lever or in the caliper and the rotary lever.

Various embodiments of the invention can be formed. According to a first exemplary embodiment, the bridge acts upon a single rotary spindle with a pressure plate essentially centered in the bridge, wherein the cross member runs at an angle to the rotary spindle and is supported on the rotary lever by one of the spherical pressure elements on each side of the rotary spindle.

Alternatively, it is contemplated that the cross member acts upon a single rotary spindle essentially centered in the bridge, wherein the bridge runs on both sides of the pressure element and engages the rotary lever, which is supported by the spherical pressure elements on the caliper.

In addition to the single-spindle embodiments, corresponding double-spindle designs can also be used. Thus, for example, it is advantageous if the cross member acts upon two pressure plates and/or rotary spindles arranged in parallel to one another, wherein the cross member is supported by at least two of the spherical pressure elements on the rotary lever. Alternatively, the cross member acts upon two pressure plates and/or rotary spindles arranged in parallel to one another, wherein the cross member contacts the rotary lever through a pivot bearing, which is supported by at least one of the spherical pressure elements on the caliper.

The plain bearings are easily fixed in place by attaching or molding at least one peg or protrusion, to secure against torsion, to the sides of each of the dome-shaped plain bearing half liners facing the recesses, with the peg or protrusion engaging a correspondingly shaped pocket hole in the bridge/cross member or the part of the caliper or the rotary lever facing away from the brake disk.

The protrusion can also be designed to accept a lubricant, as either a hollow peg or hollow protrusion, which is open to the bearing surface of the ball cup.

As the number of components is reduced in comparison to known designs, the invention also reduces susceptibility to failure. Normally, it is not necessary to feature all plain bearing half liners as ball cups. Rather it is sufficient to feature at least one plain bearing half liner in this form. In another embodiment, it is provided that at least one of the spherical pressure elements is inserted with a positive fit into the corresponding ball cup, while the remaining roller bearings are moveably inserted into the dome-shaped plain bearing half liners. This guarantees axial locking. However, tolerances and deformations linked to operating conditions can be absorbed in the corresponding components, as there is a predetermined and limited mobility of the components inserted in the dome-shaped plain bearing half liner. The dome-shaped plain bearing half liners are advantageously oval-shaped for moveable acceptance of the eccentric device and/or the roller bearings. However, there is relatively little play.

The spherical pressure elements can be cost-efficiently designed as roller bearings, which are commercially available from relevant manufacturers. They generally provide extremely high surface quality, as the maximum peak-to-valley height is two one-thousandths of a millimeter (0.002 mm). The dome-shaped plain bearing half liners are preferably manufactured from a suitable, highly stress-resistant, plain bearing half liner material (e.g., a composite bearing with polymer sliding coating). Alternatively, the dome-shaped plain bearing half liner can also be made of graphite.

Alternatively, a suitable plain bearing material can be applied directly to the surface of the dome-shaped liner for acceptance of the ball, e.g., in the form of a sliding sheet.

Other objects, advantages and novel features of the present invention will become apparent from the following detailed description of the invention when considered in conjunction with the accompanying drawings.

BRIEF DESCRIPTION OF THE DRAWINGS

FIG. 4 depicts the pneumatically operated disk brake according to the invention shown in FIG. 3 in a sectional view rotated by 90° relative to FIG. 3.

DETAILED DESCRIPTION OF THE DRAWINGS

Figure 1:
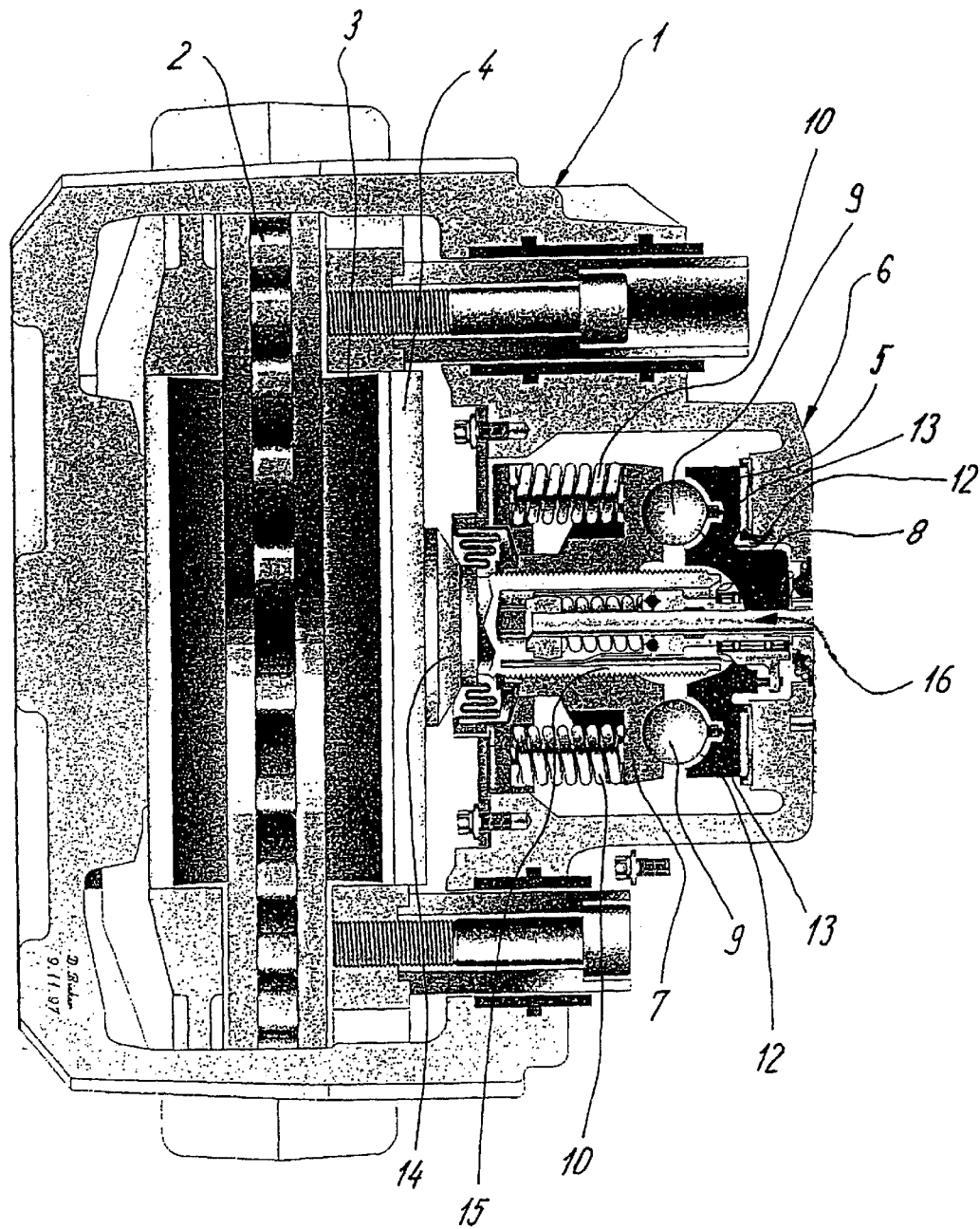
FIG. 1 is a cross-sectional view of a pneumatically operated disk brake according to the invention in a first section.

The compressed-air disk brake 1 depicted in FIG. 1 is provided with a brake disk 2 that is contacted by the brake lining 3 upon operation of the disk brake, with said lining being secured to a brake shoe 4. Operation of the brake shoe 4 occurs through an actuating device 5, which is arranged in a caliper housing. The actuating device 5 essentially consists of a cross member (or, more preferably in this case, a bridge) 7 displaceable at an angle to the brake shoe, a rotary lever 8 supported on pivot bearings, and an eccentric device (including, among other components, pressure element 9), which is arranged eccentrically to the axis of rotation of the lower eccentric segment of the rotary lever 8.

In a manner not depicted here, an operating rod engages the end of the rotary lever 8 opposite the axis of rotation of the rotary lever, so that the rotary lever 8 is pivoted in a counter-clockwise direction upon operation of the disk brake 1, as is depicted in FIG. 1. As a result, the bridge 7 is displaced against the action of pressure springs 10 in the direction of the brake shoe 3, so that tensing of the disk brake 1 is achieved. The pressure springs 10 release the braking effect as soon as the braking process has ended. In the embodiment depicted in FIG. 1, the rotary lever 8 is supported on the caliper via a roller-pivot bearing 11 (see FIG. 2). In this embodiment, the roller-pivot bearing 11 rests against the side of the rotary lever 8 facing away from the brake shoe 4.

The design of the rotary lever 8 is essentially T-shaped, wherein the section of the rotary lever 8 facing the eccentric device features two essentially semi-spherical, dome-shaped recesses into which two spherical pressure elements in the form of roller bearing balls 9 (that are part of the eccentric device) are inserted for purposes of power transmission. Also provided, as depicted in FIG. 1, are two properly aligned, dome-shaped recesses, into each of which a dome-shaped plain bearing half liner 12 is inserted. The dome-shaped plain bearing half liners 12 are made of a wear-resisting plain bearing half liner material.

Figure 2:
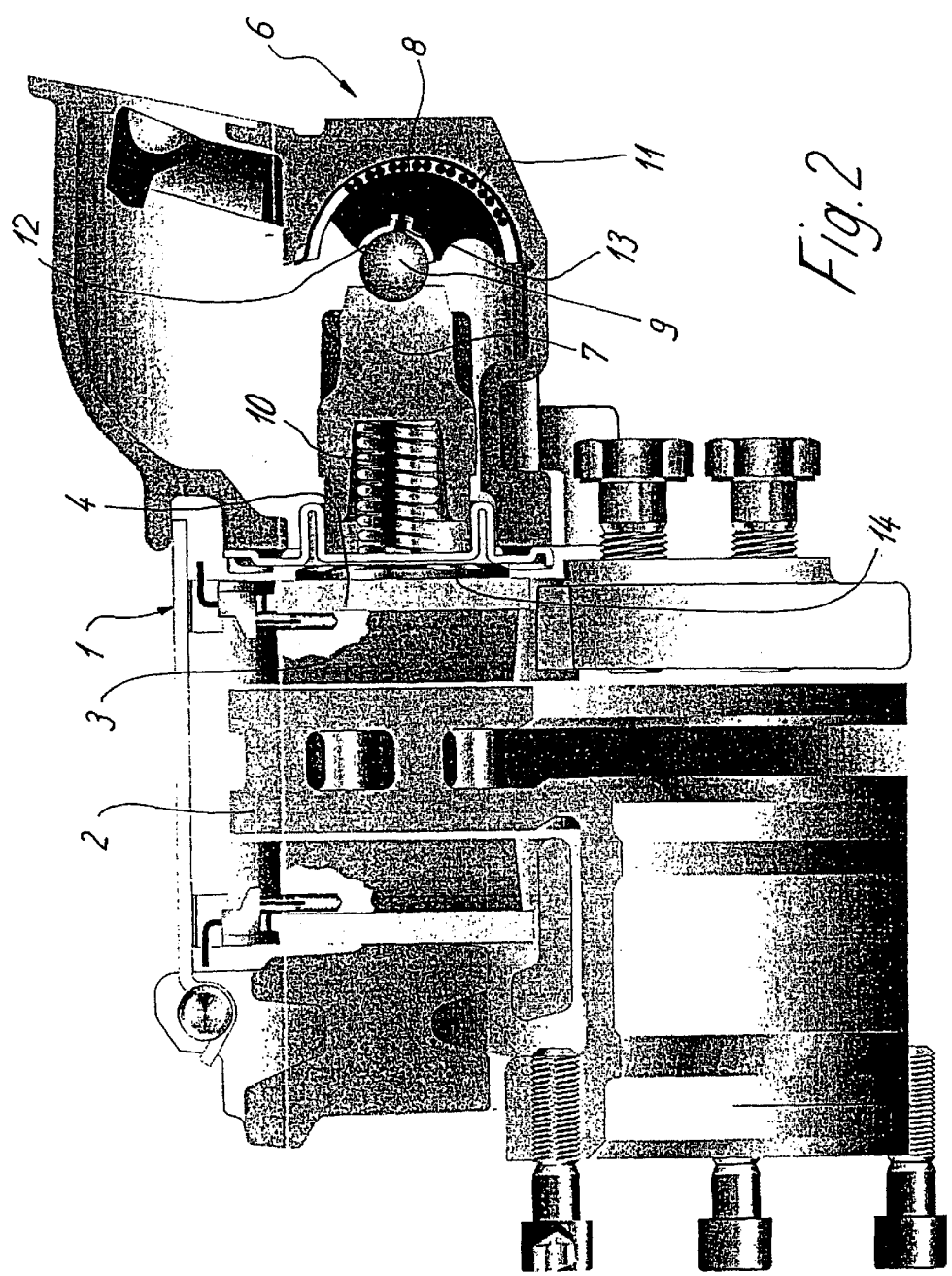
FIG. 2 depicts the pneumatically operated disk brake according to the invention shown in FIG. 1 in a sectional view rotated by 90° relative to FIG. 1.

In the embodiment depicted in FIGS. 1 and 2, a hollow cylindrical protrusion 13 (peg), which is essentially conically shaped at its free end, is molded onto the side of the ball liner 12 facing away from the roller bearing ball 9. For the purpose of permanent lubrication of the ball liner 12, a lubricant, such as lubricating grease, can be filled into the protrusion 13.

The embodiment depicted in FIGS. 1 and 2 is designed as a single-spindle embodiment, as it is provided with only one setting spindle 15 and pressure plate 14. The disk brake 1 depicted in FIG. 1 is designed for utility vehicles having a low load range, and its dimensions are correspondingly small. In contrast to the embodiment shown in the figure, the disk brake could also be executed as a double-spindle disk brake, in which case two pressure plates 14 engage the brake shoe 4.

Figure 3:
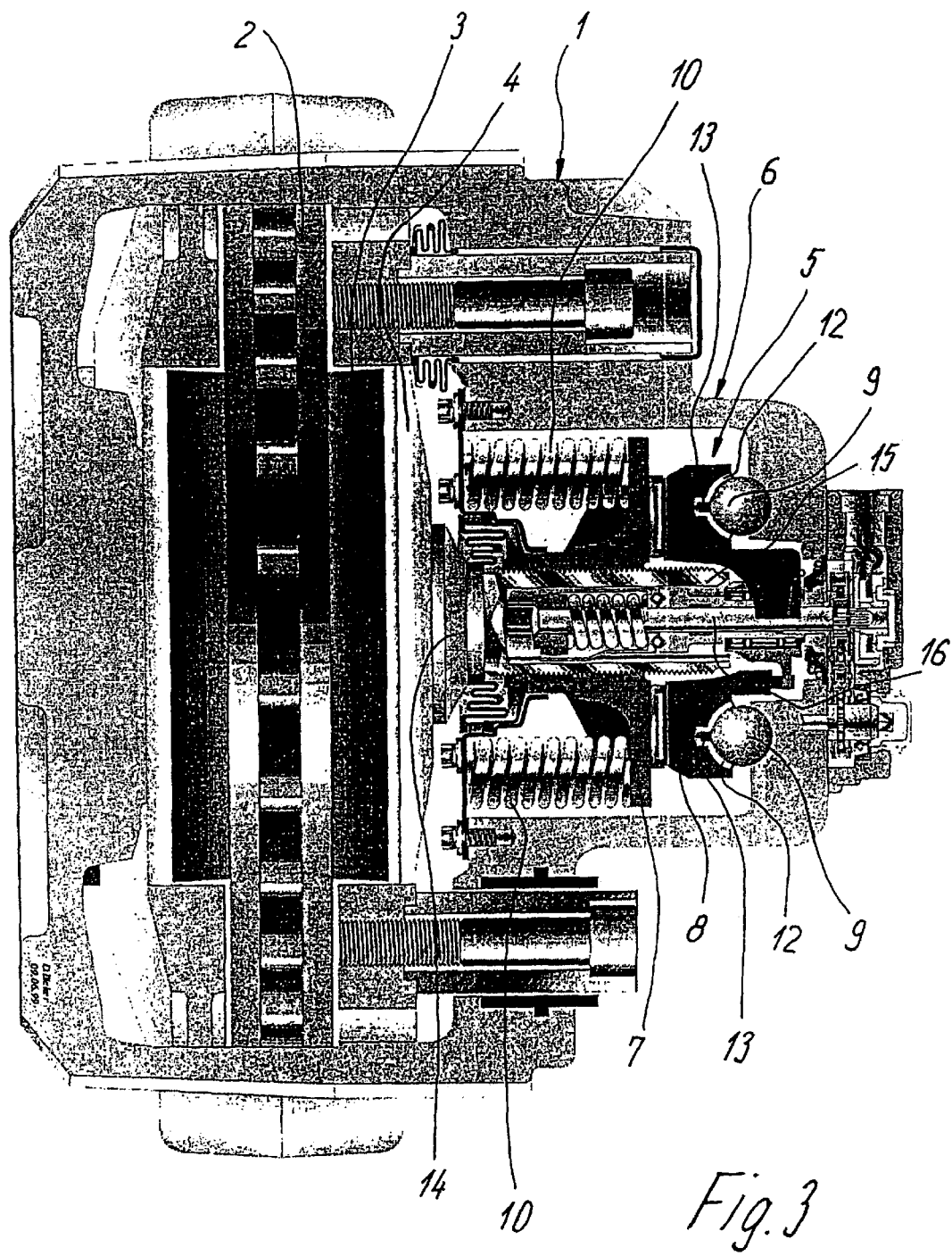
FIG. 3 is a cross-sectional view of another pneumatically operated disk brake according to the invention.

In the embodiment depicted in FIGS. 3 and 4, the pivot bearing 11 is arranged between the rotary lever 8 and the bridge 7. In contrast to the depiction according to FIGS. 1 and 2, the roller-pivot bearings 9 of the eccentric device are arranged in recesses in the rotary lever 8 on the side facing away from the brake disk 2. The dome-shaped plain bearing half liners 12 are again inserted into these recesses in the rotary lever 8. The roller-pivot bearings 9 are in this case supported by correspondingly designed, dome-shaped recesses in the caliper 6, which are shaped on the inside of the caliper (see FIG. 4). In contrast to the depiction, the dome-shaped plain bearing half liners 12 could also be inserted into grooves in the caliper 6.

The invention is not limited to the exemplary embodiments depicted. It is important, however, that at least one ball liner 12 completely encompass the roller-pivot bearing 9 arranged inside it, so as to transmit the transverse forces during the braking process. The remaining dome-shaped plain bearing half liners 12 could be designed in such a way as to allow the rolling-pivot bearings 9 to be slightly displaced therein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Table of Reference Numbers
1 Disk brake
2 Brake disk
3 Brake lining
4 Brake shoe
5 Actuating device
6 Caliper 7 Cross member (Bridge)
8 Rotary lever
9 Pressure element
10 Pressure spring
11 Roller-Pivot bearing
12 Plain bearing half liner—ball liner
13 Protrusion
14 Pressure plate
15 Rotary spindle
16 Pin

What is claimed is:

1. A disk brake, comprising:

a caliper engageable about a brake disk;

an actuating device arranged in the caliper on one side of the brake disk, the actuating device comprising at least a rotary lever supported at one end on at least one pivot bearing, and an eccentric device arranged on the rotary lever opposite the pivot bearing at the one end, the eccentric device acting upon rotation of the rotary lever to cause a brake lining to be displaced toward the brake disk;

wherein the eccentric device comprises at least one pressure element having a spherical or oval shape, and corresponding dome-shaped recesses supporting the pressure element, one of said recesses being formed in the rotary lever to support one side of the pressure element and another of said recesses being formed to support the other side of the pressure element.

2. The disk brake according to claim 1, wherein the eccentric device comprises two pressure elements each of which is supported in essentially dome-shaped plain bearing half liners, and wherein the plain bearing half liners are inserted into the corresponding dome-shaped recesses arranged in:
(a) a cross member and the rotary lever of the actuating device; or
(b) an end area of the caliper away from the brake disk and the rotary lever.

3. The disk brake according to claim 2, wherein the actuating device includes the cross member carrying a single spindle substantially centered therein, wherein the cross member extends transversely with respect to the spindle and is supported on the rotary lever by one of the pressure elements arranged on each side of the spindle.

4. The disk brake according to claim 3,
wherein one of the liners encompasses one of the pressure elements with an essentially positive fit in a play free manner, and wherein the other pressure element is designed to be inserted into another one of the liners while allowing for a limited amount of movement.

5. The disk brake according to claim 2, wherein the actuating device includes a cross member carrying a single spindle arranged substantially centrally therein, and wherein the cross member extends transversely with respect to the spindle and engages the rotary lever, the rotary lever being supported by the pressure elements on the end area of the caliper.

6. The disk brake according to claim 5,
wherein one of the liners encompasses one of the pressure elements with an essentially positive fit in a play free manner, and wherein the other pressure element is designed to be inserted into another one of the liners while allowing for a limited amount of movement.

7. The disk brake according to claim 2, wherein the actuating device includes a cross member carrying two spindles arranged in parallel to one another, the cross member being supported by at least two of the pressure elements on the rotary lever.

8. The disk brake according to claim 7,
wherein one of the liners encompasses one of the pressure elements with an essentially positive fit in a play free manner, and wherein the other pressure element is designed to be inserted into another one of the liners while allowing for a limited amount of movement.

9. The disk brake according to claim 2, wherein the actuating device includes a cross member carrying two spindles arranged in parallel to one another, the cross member contacting the rotary lever through the pivot bearing, and wherein the rotary lever is supported by at least one of the pressure elements on the end area of the caliper.

10. The disk brake according to claim 9,
wherein one of the liners encompasses one of the pressure elements with an essentially positive fit in a play free manner, and wherein the other pressure element is designed to be inserted into another one of the liners while allowing for a limited amount of movement.

11. The disk brake according to claim 1, wherein at least two pressure elements are supported in corresponding dome-shaped plain bearing half liners, and
wherein one of the liners encompasses one of the pressure elements with an essentially positive fit in a play free manner, and wherein the other pressure element is designed to be inserted into another one of the liners while allowing for a limited amount of movement.

12. The disk brake according to claim 1, wherein the pressure element is supported in a plain bearing half liner having an oval shape for moveable acceptance of the pressure element.

13. The disk brake according to claim 1, wherein the pressure element is a roller bearing ball.

14. The disk brake according to claim 13, wherein a surface of the roller bearing ball has a peak-to-valley tolerance height of less than two one thousandths of a millimeter.

15. The disk brake according to claim 1, wherein a dome-shaped plain bearing half liner supports the pressure element in one of the corresponding dome-shaped recesses, the liner including at least one protrusion that faces the one corresponding recess, the protrusion being engageable in a corresponding hole arranged in one of a cross member, an end area of the caliper, or the rotary lever.

16. The disk brake according to claim 15, wherein the protrusion is hollow in order to accept a lubricant, one end of the protrusion being open toward a bearing surface of the liner.

17. The disk brake according to claim 1, wherein the rotary lever acts directly or indirectly upon a cross member displaceable transversely with respect to the brake disk.

18. The disk brake according to claim 1, wherein at least one dome-shaped plain bearing half liner is inserted into one of the corresponding dome-shaped recesses supporting the pressure element.

19. The disk brake according to claim 18, wherein the pressure element is a roller bearing ball.

20. The disk brake according to claim 19, wherein a surface of the roller bearing ball has a peak-to-valley tolerance height of less than two one thousandths of a millimeter.

* * * * *